July 4, 1939.    H. MALLETT    2,164,415
FISH LURE
Filed Feb. 25, 1937
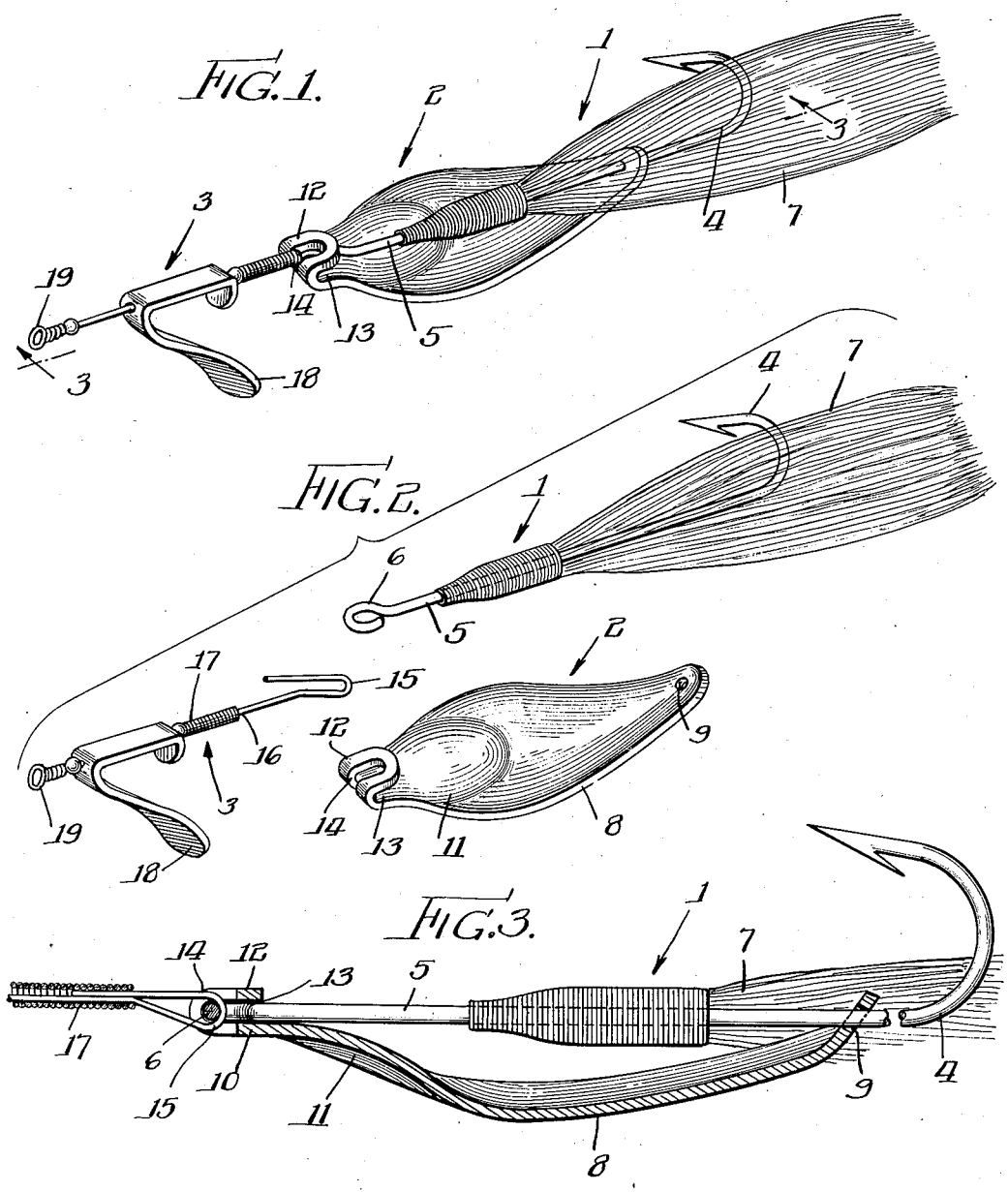

Patented July 4, 1939

2,164,415

UNITED STATES PATENT OFFICE 2,164,415

FISH LURE

Hugh Mallett, Bradford, Ill.

Application February 25, 1937, Serial No. 127,706

1 Claim. (Cl. 43—42)

This invention relates to a fish lure of the fly type.

Game fish are particularly responsive to the color of the fly employed, and it is therefore necessary for the successful fisher to change flies while fishing until the properly colored fly is found by experiment. In fish lures of the fly type with which applicant is familiar, the fly is secured to the spoon by a small threaded member such as a small screw. To change this lure from one colored fly to another colored fly requires an appreciable amount of time and the use of tools, such as a screw driver. It often happens that in making the change, the screw, being small, is lost, thus resulting in the complete destruction of the lure.

It is accordingly an object of applicant's invention to provide a spoon with means for detachably connecting a fly thereto, which means shall not require the use of tools for changing from one fly to another; which employs no small separable member subject to being lost while making the change, and which requires only a minimum amount of time to effect the desired change.

Another object of the invention is to provide means for assembling a fly and a spinner to a spoon, which means shall be quickly and readily operable while fishing to permit the substitution of another fly or spinner.

Another object of the invention is to provide an improved spoon which is capable of facile connection to a fly and shall so support the fly as to retain the hook thereof rigidly in upright position to properly snare a fish.

A still further object of the invention is to provide a spoon of such construction that the fly may be detachably secured thereto by the spinner.

Other and further objects and advantages will be apparent from the following detailed description of one illustrative embodiment of the invention, when considered with the accompanying drawing wherein:

Fig. 1 is a view in perspective of a fish lure embodying the above invention;

Fig. 2 is a perspective view similar to Fig. 1, but showing the parts disassembled;

Fig. 3 is a vertical section taken along the line 3—3 of Fig. 1.

In the drawing there is shown a fish lure comprising a fly 1, a spoon 2, and a spinner 3. The fly 1 includes the usual hook 4 having a stem 5 and an eye 6 at one end thereof. On the stem 5 there is secured, in a conventional manner, a common colored tassel 7.

The spoon 2 has a downwardly curved central portion 8, an outwardly bent portion 9, and a relatively straight opposite end portion 10. The central portion 8 is provided, adjacent the end 10, with an upwardly pressed connecting portion 11, which causes the spoon to wobble or oscillate from side to side as it is drawn through the water. Formed integrally with the straight portion 10 is an L-shaped, reversely extending lug or clevis 12, which forms, with the portion 10, a channel 13 for receiving the eye 6 of the hook 4, and this lug or clevis is slotted, as at 14, to receive the hooked end 15 of the stem 16 of the spinner 3. The stem 16 of the spinner 3 carries a spring clip 17, a spinner blade 18, and an eye 19 for attaching the lure to a fish line.

The fly, spoon and spinner are assembled to form a complete fish lure by first inserting the hook 4 through the aperture 9 and then moving the stem 5 transversely of the spoon to insert the eye 6 in the channel 13, the aperture 9 being sufficiently large to permit this transverse movement of the stem. The hooked end 15 of the spinner 3 is next inserted into the slot 14 and through the eye 6. Upon movement of the spring clip 17 downwardly and over the extending free end of the hook 15, the parts are securely latcched in operative relation.

In order to substitute a fly having a differently colored tassel, it is merely necessary to move the spring clip rearwardly, detach the hooked end 15 from the eye 6, shift the stem 5 laterally, pull the hook 4 of the fly 1 back through the aperture 9 and, in the manner previously described, insert and latch the new fly.

It will be apparent from the foregoing description that the applicant has provided an especially effective means for securing a fly and a spinner to a spoon, which means is simple in structure and readily operable to effect the substitution of other flies and/or spinners.

Changes may be made in the form, construction and arrangement of the parts without departing from the spirit of the invention or sacrificing any of its advantages, and the right is hereby reserved to make all such changes as fairly fall within the scope of the following claim.

The invention is hereby claimed as follows:

A fish lure comprising a fly having a hook with an eye at one end thereof and a lure, a spoon having a body portion and an end portion bent upwardly and inwardly of said body portion to form a channel for receiving one end of said hook, said channel having a slot extending in a direction transverse of the plane of the hook eye when positioned in the channel, said channel constituting a bifurcation, and a spinner having a hooked end, the end portion of the spoon being provided with said slot to permit the hooked end of the spinner to pass therethrough and detachably engage the eye end of the hook whereby to directly connect the spinner with the hook and retain the spoon upon the hook, the hook of the spinner being positioned in the bifurcation when the loop thereof is positioned in the eye of the hook whereby upon release of the spinner hook from the eye of the fly hook, the eye of the fly hook will be free for release from the channel by either longitudinal or lateral movement.

HUGH MALLETT.